April 9, 1963    R. E. KAATZ ETAL    3,084,443
DIRECTIONAL INDICIA AND OCULAR DEVICE
Filed Dec. 28, 1959

RONALD E. KAATZ
JOHN S. WALLINGFORD
INVENTORS

BY John L. Woodward
Attorney

United States Patent Office 3,084,443
Patented Apr. 9, 1963

3,084,443
DIRECTIONAL INDICIA AND OCULAR DEVICE
Ronald E. Kaatz, 3605 E. 42nd St., and John S. Wallingford, 417 11th Ave. SE., both of Minneapolis, Minn.
Filed Dec. 28, 1959, Ser. No. 862,294
4 Claims. (Cl. 33—72)

This invention relates to an ocular device and/or a combination directional indicator and ocular device.

Heretofore, directional indicators and ocular devices have been separate instruments and have not been coordinated efficiently.

This device includes a portable combination directional indicator and ocular device which comprise a container having a first wall upon which may be mounted an eye piece lens and a second opposite transparent wall beyond which a field lens may be mounted. The container carries a transparent liquid which supports a transparent body with a magnet mounted in the body. The density of the liquid is equal to the density of the body and magnet combination whereby the body floats in the liquid and orients itself with respect to the earth's magnetic field. Longitudinal type lines are carried on the body member. The body may also bear latitudinal lines so that the device may be utilized as an inclinometer, or so arranged that the vertical height differences are equal. Also indicia means may be carried on one of the transparent walls for using the device to measure the pitch from the vertical.

A modified directional indicator and ocular device combines in a container a first transparent wall upon which can be mounted an eye piece lens and a transparent convexed wall opposite and in alignment with the first wall of the container so that the field lens can be eliminated. A transparent liquid is carried in the container and a transparent body carrying indicia means is supported by the liquid.

Another modified directional indicator and magnifying or ocular device consists of a container having a first wall upon which can be mounted an eye piece lens. A transparent second wall is spaced opposite the first wall. A liquid which need not be transparent, is carried in the container and a transparent body is supported by the liquid. The liquid level in the container is below the optical path of the device. The body has a sufficiently high index of refraction so that the field lens can be eliminated from this instrument.

It is an object of this invention to provide a portable directional indicator and ocular device.

It is another object of this invention to provide in a combined directional indicator and ocular device which allows the user to take a bearing on an object without taking his eye from the object.

It is a further object of this invention to provide a directional indicator and ocular device which need not be held perfectly level in operation.

It is still a further object of this invention to provide a directional indicator and ocular device which is easy to operate.

Other and further objects of this invention will become obvious from the detailed description and subjoined claims in which:

Figure 2:
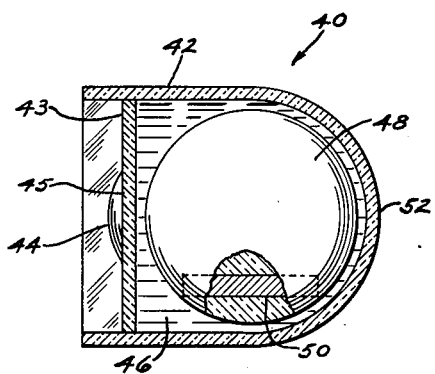
FIGURE 2 is a longitudinal elevational view of a modified form of a directional indicator and ocular device, parts in section, and parts broken away.

Referring now in detail to the drawing, wherein for the purpose of illustration, there are disclosed in the figures and their descriptions, some of the possible variations in materials employed and the construction utilized. The device 10 comprises a cylindrical container 12 formed of Plexiglas. The rear wall or stop 14 of the container 12 is transparent in a central portion and an eye piece lens 16 is mounted on the outside of this central portion of the wall 14. The opposite liquid stop of front wall 18 is transparent and is provided with a vertical hairline. A field lens 20 is mounted on the container 12 and is spaced beyond the front wall 18 of the container 12.

Figure 1:
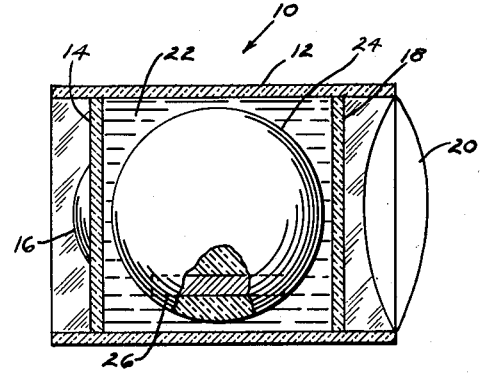
FIGURE 1 is a longitudinal elevational view of the directional indicator and ocular device, parts in sections and part broken away.

A transparent liquid, carbon tetrachloride (CCl$_4$) 22, for example, is carried in the container 12 and a transparent body 24 is supported by the liquid. A magnet 26 is mounted in the lower portion of the body 24. The density of the liquid 22 is equal to the density of the body 24 and magnet 26 combination so that the sphere 24 will be supported by the liquid and the sphere 24 is almost submerged therein, but it is always at least three fourths submerged. It would, of course, be possible to float a sphere high in a liquid (not over one fourth submerged), see FIGURE 3. If the sphere 24 is solid and by virtue of its optical properties, it could be substituted wholly or in part for the field lens 20 of FIGURE 1, or the eye piece lens 66 of FIGURE 3: or for both the field lens 20 of FIGURE 1, and the eye piece lens 66 of FIGURE 3.

The transparent sphere 24 is spaced away from the sides of the container 12 so that it can orient in the earth's magnetic field. The sphere 24 carries longitudinal lines 30 which have degree markings associated with them, see FIGURE 4, and an observer looking through the eye piece lens 16 will focus on the longitudinal lines 30 on the sphere 24 which is oriented in space, and the observer could immediately determine the magnetic bearing of the object at which he is looking. Simultaneously, the image of any object in such direction would be magnified by the eye piece lens and field lens. It is to be understood that the ocular is to be used with conventional prisms, inverting lenses or any suitable optical system.

The magnet 26 is placed in the sphere 24 below the optical path of the device. The longitudinal markings 30 on the side of the sphere 24 adjacent the field lens 20 are in the focal plane of the device.

In the modified device, 40, shown in FIGURE 2 of the drawing, the container 42 is formed of Plexiglas and is provided with a rear vertical wall 43 having a central transparent portion 45. An eye piece lens, 44, is mounted on the outside of the central portion 45 of the rear wall 43. A liquid 46, carbon tetrachloride, for example, is carried in the container 42 and a solid transparent sphere 48 of Plexiglas is supported by the liquid. A magnet 50 is mounted in the lower portion of the sphere 48. The front wall 52 is of convex shape. A field lens is unnecessary due to the optical properties of the convexed part 52 of the container 42 and the portion of the liquid 46 adjacent the convex wall 52.

Figure 3:
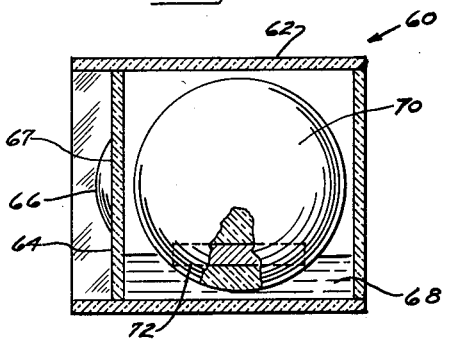
FIGURE 3 is a longitudinal elevational view of another modified form of directional indicator and ocular device, parts in section and parts broken away.

In the modified device 60 disclosed in FIGURE 3 of the drawing, a Plexiglas container 62 is of cylindrical shape and is provided with a rear wall 64 having a central transparent portion 67. An eye piece lens 66 is mounted on the outside of the wall 64 at its central portion 67.

A suitable liquid 68 is carried in the lower portion of the container 62 and its level is spaced below the optical path of the device 60. A sphere 70 is supported by the liquid 68 in the container 62. A magnet 72 is mounted in the sphere 70 below the optical path of the instrument 60. The liquid 68 is of greater density than the liquids 22 and 46 of the instruments 10 and 40 respectively. Liquid 68 need not be transparent.

If the index of refraction and the radius of curvature of the sphere 70 were of certain values, then the eye piece lens 66 could also be eliminated.

In another modified type of directional indicator and ocular device 108, the container is a hollow transparent sphere 110 in which is carried a transparent fluid 112 for floating a solid sphere member 114. A magnet 116 is mounted in the sphere 114. This device is optically similar to the device of FIGURE 2 except that both field and eye lenses are replaced by curved surfaces.

Figure 4:
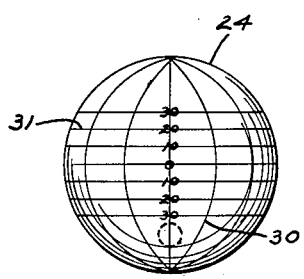
FIGURE 4 is an elevational view of the body member used in the devices disclosed in FIGURES 1, 2 and 3 which is provided with latitudinal and longitudinal markings.

FIGURE 4 discloses the sphere 24 which bears latitudinal lines 31 so arranged so that the instrument can be utilized as inclinometer for reading the inclination from the horizontal or so arranged so that the vertical height differences are equal.

Figure 5:
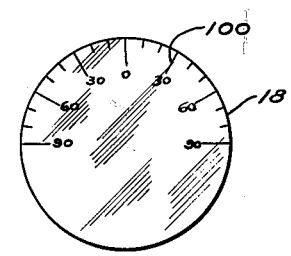
FIGURE 5 is an elevational view of the transparent wall of the container of the device provided with degree markings for use in measuring the pitch from the vertical.
Figure 6:
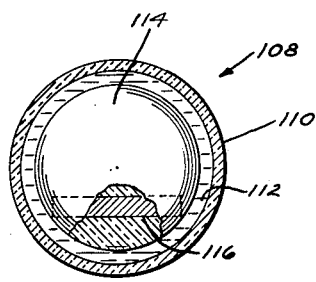
FIGURE 6 is a elevational view of another modified directional indicator and ocular device, parts in section and parts broken away.

In FIGURE 5, the front liquid stop or wall 18 is provided with degree markings 100 so that the instruments 10, 40 and 60 can be employed to measure pitch from the vertical.

The bodies of containers 12, 42 and 62 can be made of any non-porous, non-magnetic material such as Plexiglas or aluminum.

The lenses of ocular devices can be arranged in the relationships other than those set forth above. For example, Ramsden or Kellner ocular systems could be employed in which systems the focal plane would be on the left surface of spheres 24, and 48 of the instruments 10 and 40. The field lens of the Ramsden ocular is positioned between the rear wall of the container and the eye piece lens. Any suitable lenses may be employed such as compound lenses, etc.

The liquids for floating or supporting the spheres in the containers should be chosen for their index of refraction with respect to the index of refraction of the sphere for distortion considerations. The liquids used should be chosen by considering their freezing points for arctic use and their boiling points for tropic use. The density of the liquids must be adjusted to the sphere-magnet combination. The liquids used must be transparent for most uses and could be colorless. Their coefficient of thermal expansion should be considered as well as their permeability.

The instruments utilizing this invention can be used by fishermen and hunters to determine direction and also to clearly determine their position. Also the instruments may be used by the military for directing gun fire more efficiently than at present.

While several embodiments of the device of the present invention have been disclosed, it is to be understood that the invention need not be limited to the embodiments shown and described but is susceptible of modifications falling within the spirit of the invention and the scope of the appended claims.

Having thus described the invention, what is claimed is:
1. An ocular device and directional indicator comprising in combination a closed hollow container provided with two spaced apart transparent walls, a transparent liquid carried in the container, a transparent solid spherical member supported by the liquid in the container, a magnet mounted in the member, the density of the liquid approximately equaling the density of the magnet and member combination whereby the member floats submerged in the liquid, the member orienting in the direction of the earth's magnetic field, indicia means on the said member, an eye piece lens mounted on the first one of said spaced walls, and a field lens mounted on the container and being spaced apart and beyond the second of the said walls, the spherical member, the eye piece lens, and field lens being in optical alignment with each other.

2. An ocular device and directional indicator comprising in combination a closed hollow container, a transparent liquid carried in the container, a transparent solid spherical member supported by the liquid in the container, a magnet mounted in the member, the density of the liquid approximately equaling the density of the magnet and member combination whereby the member floats submerged in the liquid, the member orienting in the direction of the earth's magnetic field, indicia means on the said member, an eye piece lens mounted on a first portion of the container, a second portion of the container being curved to serve as the field lens, the curved portion of the container being in optical alignment with the member and the eye piece lens on the said first portion of the container.

3. A directional indicator and an ocular device comprising in combination a closed hollow container provided with two spaced apart transparent walls, a liquid carried in the container, a solid transparent spherical member supported by the liquid in the container, a magnet mounted in the member, the density of the liquid being greater than the density of the member and magnet combination whereby the member floats relatively high in the liquid, the member orienting in the liquid in the direction of the earth's magnetic field, indicia means on the member, and an eye piece lens mounted on one of said walls, the member serving as the field lens for the device, the other of said walls being in optical alignment with said member and said eye piece lens.

4. An ocular device and directional indicator comprising in combination a closed hollow container, a transparent liquid disposed in said container, a unit comprising a transparent solid spherical member and a magnet carried thereby, the density of the liquid being approximately equal to the density of said unit whereby the unit will float in the liquid, the said unit orienting in the direction of the earth's magnetic field, indicia means on the said unit, an eye piece lens mounted on a first transparent portion of the said container, and another transparent portion of said container being in optical alignment with said unit and said lens.

References Cited in the file of this patent

UNITED STATES PATENTS

| | | |
|---|---|---|
| 2,260,396 | Otto | Oct. 28, 1941 |
| 2,500,410 | Hewitt | Mar. 14, 1950 |
| 2,830,381 | Morris | Apr. 15, 1958 |

FOREIGN PATENTS

| | | |
|---|---|---|
| 763,324 | France | Feb. 12, 1934 |